Figure 1:
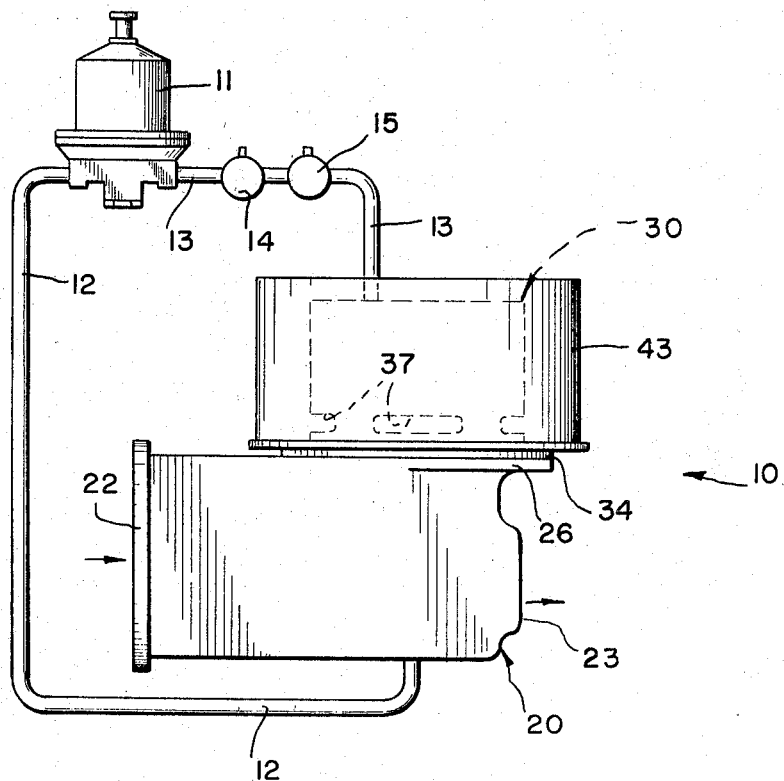

Dec. 20, 1966  P. D. WEBB  3,292,732
PRESSURE FLUID CONTROL AND UNLOADER THEREFOR
Filed March 30, 1964  4 Sheets-Sheet 1

INVENTOR.
PAUL D. WEBB
BY Charles J. Worth
AGENT

United States Patent Office 3,292,732
Patented Dec. 20, 1966

3,292,732
PRESSURE FLUID CONTROL AND
UNLOADER THEREFOR
Paul D. Webb, Tioga, Pa., assignor to Ingersoll-Rand
Company, New York, N.Y., a corporation of New
Jersey
Filed Mar. 30, 1964, Ser. No. 355,878
4 Claims. (Cl. 181—37)

This invention relates to means for controlling flow of pressure fluid such as the output of a compressor and an unloader therefor.

Control means and unloaders therefor of the type considered herein are at the present time complicated and, therefore, costly. The novel control and unloader of the present invention are adapted to control the output of a compressor, by limiting the pressure thereof to a predetermined maximum and providing no load conditions for the compressor when desirable such as during start-up.

Accordingly, an object of the present invention is to provide means for controlling the output of a compressor which is of relatively simple construction, is relatively inexpensive to manufacture, and is not readily subject to malfunction.

Another object of the present invention is to provide the foregoing control which is highly sensitive and responsive to changes in compressor output and operating conditions.

And another object of the present invention is to provide the foregoing control that can provide, with facility, a compressor with no load conditions when required.

Still another object of the present invention is to provide an unloader for the foregoing control which is pilot operated by a pressure difference between the pressure of the fluid being delivered and a regulated opposing pressure.

And still another object of the present invention is to provide means for readily venting the opposing pressure to provide no load conditions.

The present invention contemplates the provision of a new and improved apparatus for controlling the flow of pressure fluid. This new and improved apparatus comprises a fluid conduit having an inlet for receiving pressure fluid and an outlet for discharging pressure fluid, and a housing having an exhaust passage which is connected to the fluid conduit. A valve member is slideably disposed in the housing for movement between a position wherein it closes the exhaust passage from communication with the fluid conduit and a position wherein it permits communication between the exhaust passage and the fluid conduit. A conduit means connects the fluid conduit with the housing for supplying pressure fluid from the fluid conduit to the housing; and a means utilizes pressure fluid supplied to the housing by the conduit means for biasing the valve member to its position wherein it closes the exhaust passage from communication with the fluid conduit. A muffler means comprising a pair of concentric ring members is provided for muffling the noise of pressure fluid passing through the exhaust passage and muffling the noise of pressure fluid passing through the fluid conduit to the outlet of the fluid conduit.

The foregoing and other objects and advantages will appear more fully hereinafter from a consideration of the detailed description which follows, taken together with the accompanying drawings wherein several embodiments of the invention are illustrated by way of example. It is to be expressly understood, however, that the drawings are for illustration purposes only and are not to be construed as defining the limits of the invention.

Figure 2:
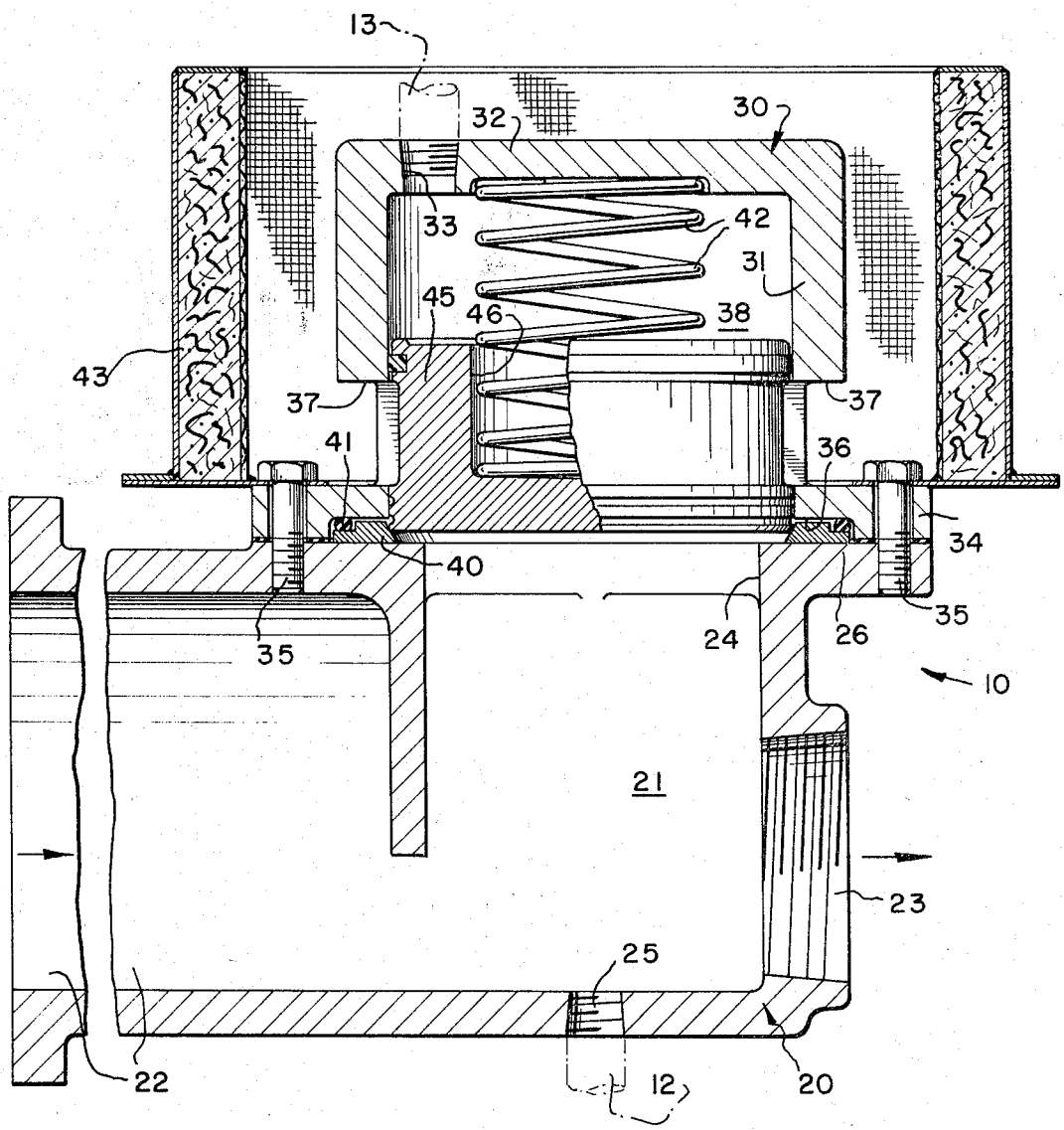
Figure 3:
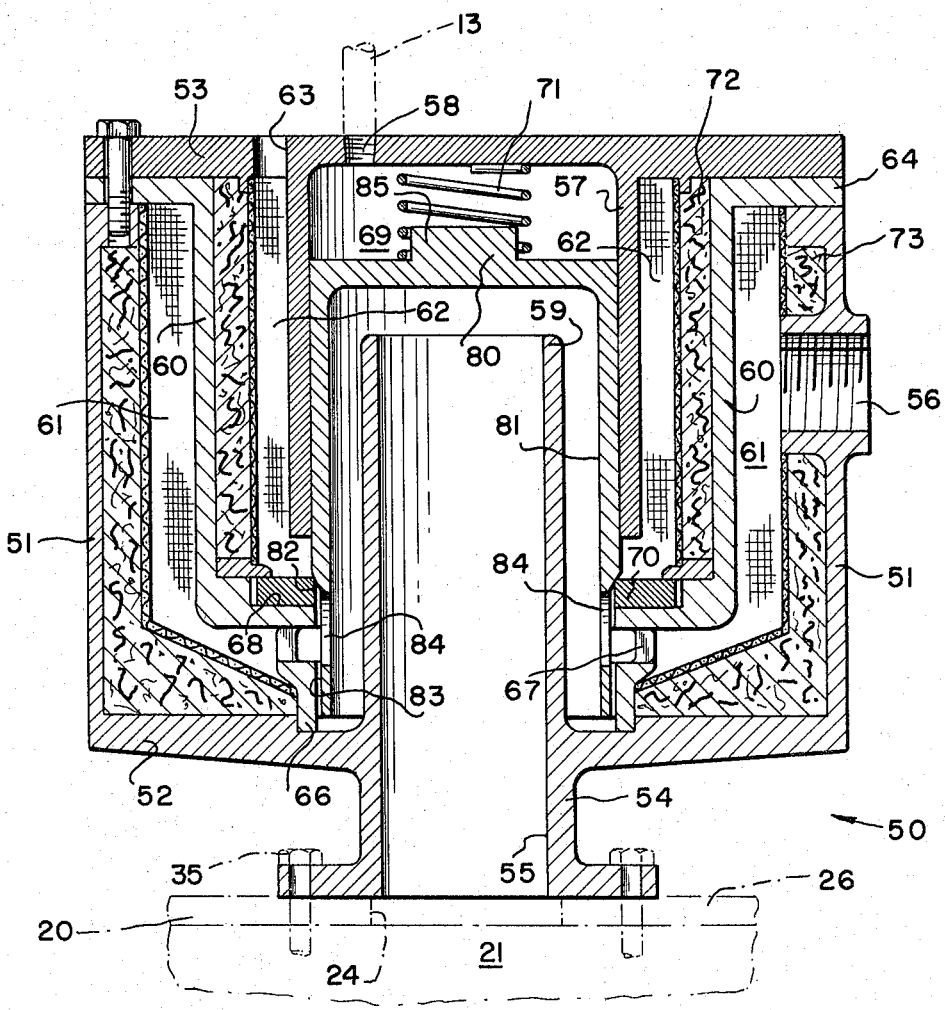
Figure 4:
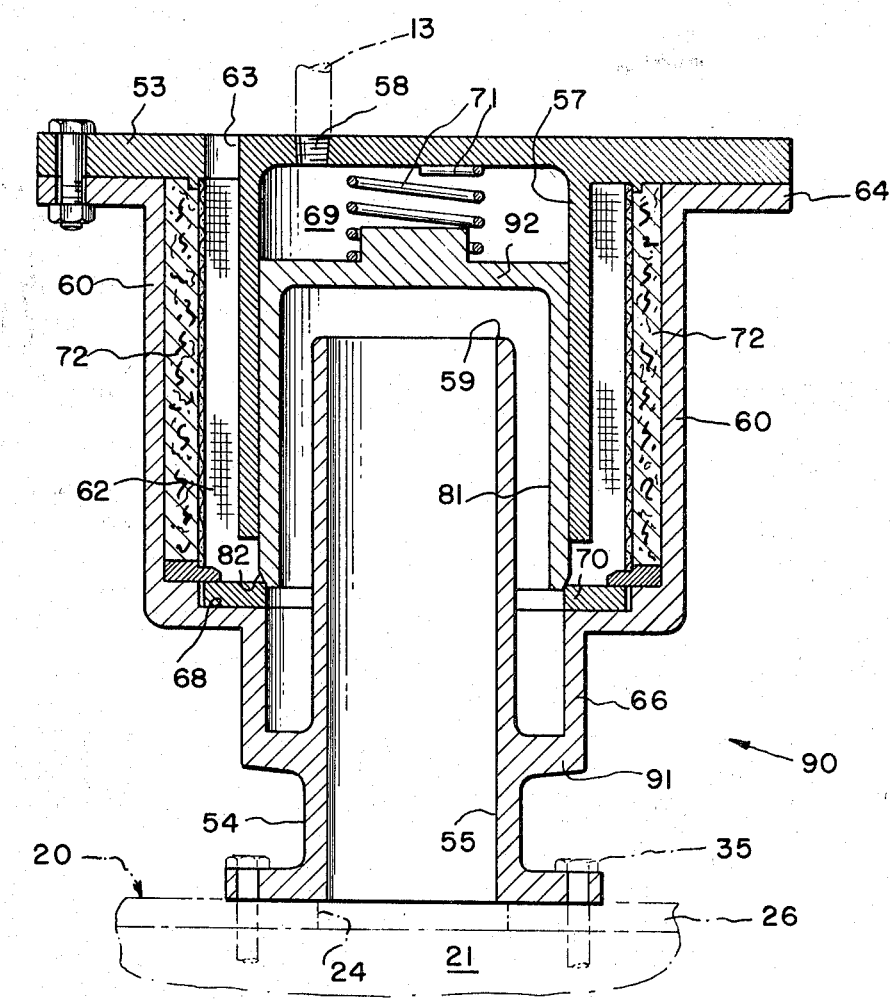

FIG. 1 is a schematic view of a control made in accordance with the present invention, FIG. 2 is an enlarged sectional view of the novel unloader of the control of FIG. 1, and FIGS. 3 and 4 are sectional views corresponding to FIG. 2 each illustrating a modified unloader adapted to be used in the control of FIG. 1.

In accordance with the present invention, an unloader 10 is provided to control pressure fluid output of a compressor (not shown). As shown in FIG. 2, the unloader 10 has a housing formed by a valve casing 30 connected to a receiver casing 20.

Casing 20 is essentially a fluid conduit and defines a receiver chamber 21 having an inlet 22 to receive pressure fluid, an outlet 23 for discharging the pressure fluid, a valve port 24, and a pilot port 25.

Valve casing 30 has a bore 31 open at the end adjacent casing 20 that is in communication with chamber 21 through port 24, and closed at its other end by a wall 32 that has a port 33 therethrough. A flange 34 is provided at one end of casing 30 that is connected by bolts 35 to a wall 26 of casing 20.

An annular groove 36 encircling the open end of bore 31 is provided to form an annular recess between casing 30 and wall 26 to house a valve seat ring 40, and an O-ring seal 41 to prevent leakage of pressure fluid.

Although bore 31 is substantially axially alined with port 24, ring 40 is slidable in groove 36 to provide a self-alining seat for a piston type valve member 45 that is slidably disposed in the bore 31. It should be understood that groove 36 is provided in flange 34 as a matter of choice for descriptive purposes only, and may alternatively, be provided in wall 26, or partially in flange 34 and partially in wall 26.

Casing 30 has a plurality of openings 37 adjacent flange 34 to provide bore 31 with exhaust ports that are closed by valve member 45 when seated on ring 40. A spring 42 is disposed in bore 31 between end wall 32 and valve member 45, which defines a pressure chamber 38, and acts to bias valve member 45 onto its seat 40. As shown, valve member 45 may have a recess 46 to provide a socket for one end of spring 42.

A muffler ring 43 is provided around casing 30 for sound abatement when pressure fluid escapes from exhaust ports 37. Muffler 43 has a ring type end plate which is connected to unloader 10 by bolts 35 which connect casing 30 to casing 20.

As shown in FIG. 1, a pressure regulator 11 is connected to one end of a conduit 12 that is connected at its other end to pilot port 25 to receive pressure fluid from the receiver or inlet chamber 21. Pressure regulator 11 is connected at one end of a conduit 13 that is connected to port 33 to automatically provide regulated pressure fluid to pressure chamber 38. A manual exhaust valve 14 and a relief valve 15 for chamber 38 may be connected in conduit 13, as shown, or may have their own connections.

In normal operation, chamber 21 of unloader 10 provides a flow path which receives pressure fluid at its inlet 22 from a compressor (not shown) and discharges pressure fluid through outlet 23 to equipment (not shown) for use. Pressure fluid in chamber 21 is transmitted through line 12, pressure regulator 11, and line 13 to pressure chamber 38 for biasing, with spring 42, the valve member 45 onto its seat 40 thus closing the exhaust ports 37 from chamber 21 to provide full flow of pressure fluid from the compressor through unloader 10.

Pressure in chamber 21 acts on valve member 45 tending to move it away from its seat 40 and is opposed by the pressure in chamber 38 combined with the force of spring 42. By adjustment of the pressure regulator 11, sufficient pressure is transmitted from chamber 21 to chamber 38 to hold valve member 45 seated until a desired maximum pressure is present in chamber 21. Further increases beyond the maximum desired pressure in chamber 21 is partially transmitted to or blocked from chamber 38 creating a reversed resultant force which moves valve member 45 from its seat 40 opening a controlled escape path from chamber 21 to exhaust ports 37. Relief valve 15 is provided in case of failure of the pressure regulator 11.

To start a compressor utilizing the present invention under substantially no load conditions, valve 14 is opened to vent chamber 38. The force exerted by spring 42 biasing valve member 45 onto seat 40 is relatively small and in the absence of pressure in chamber 38 is rapidly overcome by a small pressure in chamber 21 which unseats valve member 45 to provide an escape path to exhaust ports 37.

A modified unloader 50, as shown in FIG. 3, may replace the unloader 10 in the control system of FIG. 1. A cylindrical wall 51 closed at its end by spaced bottom and top walls 52 and 53 is provided to generally correspond to casing 30. Bottom wall 52 has a flanged neck 54 connected to wall 26 of casing 20 by bolts 35, and a bore 55 is provided through wall 52 and neck 54 which communicates with chamber 21 through port 24. Outlet 23 of chamber 21 is plugged (not shown) and, in its place, an outlet 56 is provided in wall 51. Wall 52 may have a standpipe 59, as shown, with bore 55 extending therethrough.

Top wall 53 has a downwardly extending cylindrical wall 57, corresponding to the bore 31 of casing 30, that is concentric with and spaced inwardly from cylindrical wall 51. Wall 53, also has a port 58 communicating with the area within wall 57 corresponding to port 33 of casing 30. Cylindrical wall 57 terminates short of bottom wall 52. Therefore, there is communication between the area bounded by wall 57 and the area between walls 51 and 57.

An intermediate annular wall 60 is disposed between annular walls 51 and 57 dividing the area therebetween into an annular flow passage 61 in communication with outlet 56 and an annular flow or exhaust passage 62 in communication with one or more exhaust ports 63 in the top wall 53 which correspond to exhaust ports 37 of unloader 10. The intermediate annular wall 60 is supported by an outwardly extending annular flange 64 connected between the end of cylindrical wall 51 and top wall 53, and has an inwardly extending annular flange that is in spaced relationship between the bottom end of wall 57 and the bottom wall 52. A cylindrical skirt 66 depends from the latter mentioned flange to the bottom wall 52 and has a plurality of angularly spaced ports 67 therethrough forming inlets to annular passage 61. Said latter mentioned flange has an annular groove 68 in its top surface to receive and support a ring 70 which is movable therein to provide a self-alining valve seat that is spaced from the bottom end of wall 57 forming therebetween the inlet end of exhaust passage 62.

A piston type valve member 80 slidably mounted in wall 57 has a recess 81 for standpipe 59 and an annular face 82 for seating on ring 70 to block flow from exhaust passage 62 and ports 63. A spring 71 is disposed in a pressure chamber 69, corresponding to pressuing chamber 38, within wall 57 that is defined by the top wall 53 and the valve member 80. The spring 71 biases valve member 80 toward its exhaust flow blocking position urging face 82 into engagement with seat 70, and during operation combines with the pressure in chamber 69 provided by conduit 13 through port 58. A boss is provided on valve member 80 as a seat for one end of spring 71.

Valve member 80 could end at its face 82, thus a constant flow path would be provided from chamber 21 to outlet 56. Alternatively, as shown, valve member 80 may have a reduced portion 83 that extends from face 82 into skirt 66 toward wall 52. The reduced portion 83 has a plurality of ports 84 alined with ports 67 to provide unimpeded flow to outlet 56 when face 82 engages seat 70.

As valve member 80 moves against the pressure in chamber 69 and the bias of spring 71, ports 84 misaline with ports 67 tending to limit flow to outlet 56, and simultaneously aline with the inlet end of passage 62 to provide exhaust flow.

In unloader 50, a sound abatement means is provided within the unloader housing. As shown, a muffler ring 72, corresponding to muffler ring 43, is disposed in passage 62 adjacent wall 60. An additional muffler ring 73 is preferably provided in passage 61 adjacent walls 51 and 52.

It should be readily understood that unloader 50 operates in the same manner as unloader 10 and may have the advantages of additional sound abatement and valved flow control between the inlet 22 and outlet 56. Similarly, the forces acting on valve member 80 of unloader 50 are the same as those acting on valve member 45 of unloader 10.

An unloader 90, shown in FIG. 4, is a modification of unloader 50 of FIG. 3, wherein outlet 23 (not shown) is open as in unloader 10 of FIG. 2. The cylindrical wall 51, the outlet 56, and the muffler ring 73 of unloader 50 are removed eliminating flow passage 61 which is not required. A bottom wall 91 (wall 52 of unloader 50 reduced in size) is connected, or, as shown, is integral with skirt 66 which has no ports 67 as they are not required. A piston type valve member 92 is provided which is the valve member 80 with the reduced portion 83 removed as heretofore discussed relative to unloader 50.

Although several embodiments of the invention have been illustrated and described in detail, it is to be expressly understood that the invention is not limited thereto. Various changes may be made in the design and arrangement of the parts without departing from the spirit and scope of the invention as the same will now be understood by those skilled in the art.

I claim:
1. An unloader comprising:
 (a) a housing having an inlet adapted to receive pressure fluid, an outlet for discharging pressure fluid received by the inlet, and an exhaust port for pressure exhausting fluid when the pressure thereof exceeds a predetermined maximum;
 (b) a valve seat disposed in the housing between the inlet and the exhaust port;
 (c) a valve member slidably disposed in the housing engaging the seat to block flow of pressure fluid from the inlet to the exhaust port which urges the valve member away from the seat;
 (d) the housing defining a pressure chamber on the side of the valve member opposite from the inlet having a port adapted to receive controlled pressure fluid which biases the valve member onto the seat until the pressure of fluid received at the inlet exceeds a predetermined maximum;
 (e) the valve member having passage means providing communication from the inlet to the outlet when the valve member engages the seat;
 (f) the passage means progressively restricting the communication from the inlet to the outlet and providing progressively increasing communication from the inlet to the exhaust port as the valve member progressively moves away from the seat; and
 (g) muffler means connected to said housing for abating the noise caused by flow of pressure fluid;
 (h) said muffler means comprising a pair of concentric ring members disposed in said housing on the side of said valve member opposite from the inlet;
 (i) one of said ring members being along a path of flow of exhausting pressure fluid and the other of said ring members being along the path of flow to the outlet.

2. An apparatus for controlling the flow of pressure fluid, comprising:
 a fluid conduit having an inlet for receiving pressure fluid and an outlet for discharging pressure fluid;

a housing having an exhaust passage connected to said fluid conduit intermediate the inlet and the outlet of said fluid conduit for exhausting pressure fluid from said fluid conduit;

a valve member slideably disposed in said housing for movement between a position wherein it closes said exhaust passage from communication with said fluid conduit and a position wherein it permits communication between said exhaust passage and said fluid conduit;

conduit means connecting said fluid conduit with said housing for supplying pressure fluid from said fluid conduit to said housing;

means utilizing pressure fluid supplied to said housing through said conduit means for biasing said valve member to its position wherein it closes said exhaust passage from communication with said fluid conduit; and muffler means comprising a pair of concentric ring members for muffling the noise of pressure fluid passing through said exhaust passage and muffling the noise of pressure fluid passing through said fluid conduit to the outlet of said fluid conduit.

3. An apparatus according to claim 2, wherein said fluid conduit extends through said housing, and said muffler means is disposed within said housing.

4. An apparatus according to claim 3, wherein said valve member is constructed to close the outlet of said fluid conduit from communication with the inlet of said fluid conduit when it permits communication between said exhaust passage and said fluid conduit.

References Cited by the Examiner

UNITED STATES PATENTS

| | | | |
|---|---|---|---|
| 90,483 | 5/1869 | Bartholomew | 137—119 |
| 399,663 | 3/1889 | Glass | 137—489.5 |
| 1,859,357 | 5/1932 | Elder | 137—119 |
| 2,869,670 | 1/1959 | Hoffman | 181—35 |
| 2,971,524 | 2/1961 | Ruhl | 137—108 |
| 3,017,897 | 1/1962 | Seguenot | 137—529 |

FOREIGN PATENTS

| | | |
|---|---|---|
| 994,110 | 11/1951 | France. |
| 622,556 | 5/1949 | Great Britain. |

WILLIAM F. O'DEA, *Primary Examiner.*

ISADOR WEIL, *Examiner.*

D. LAMBERT, *Assistant Examiner.*

UNITED STATES PATENT OFFICE
CERTIFICATE OF CORRECTION

Patent No. 3,292,732                                    December 20, 1966

Paul D. Webb

It is hereby certified that error appears in the above numbered patent requiring correction and that the said Letters Patent should read as corrected below.

Column 4, lines 41 and 42, for "pressure exhausting fluid" read -- exhausting pressure fluid --.

Signed and sealed this 26th day of September 1967.

(SEAL)
Attest:

ERNEST W. SWIDER
Attesting Officer

EDWARD J. BRENNER
Commissioner of Patents